United States Patent [19]

Yasui

[11] Patent Number: 4,884,356

[45] Date of Patent: Dec. 5, 1989

[54] FISHING ROD

[75] Inventor: Toshihiko Yasui, Sakai, Japan

[73] Assignee: Shimano Industrial Company Limited, Osaka, Japan

[21] Appl. No.: 324,103

[22] Filed: Mar. 16, 1989

[30] Foreign Application Priority Data

Mar. 17, 1988 [JP] Japan ................................. 63-35953

[51] Int. Cl.⁴ ........................................... A01K 87/00
[52] U.S. Cl. ...................................................... 43/23
[58] Field of Search ............................. 43/23, 22, 18.1

[56] References Cited

U.S. PATENT DOCUMENTS

| | | | |
|---|---|---|---|
| 2,737,747 | 3/1956 | Benson et al. | 43/23 |
| 4,494,333 | 1/1985 | Jacobson | 43/23 |
| 4,697,376 | 10/1987 | Brackett et al. | 43/23 |
| 4,817,324 | 4/1989 | Brackett et al. | 43/23 |

Primary Examiner—M. Jordan
Attorney, Agent, or Firm—Stevens, Davis, Miller & Mosher

[57] ABSTRACT

A fishing rod provided at one circumferential side of a bottom rod at a rod body with a reel mounting portion through which a fishing reel is mounted onto the rod body, and behind the reel mounting portion with a grip, so that a sliding member of a hard and wear resistant material and of a predetermined length is mounted on at least one of the surface of the grip at a side of the reel mounting portion and the surface of the same reverse to the reel mounting portion.

3 Claims, 1 Drawing Sheet

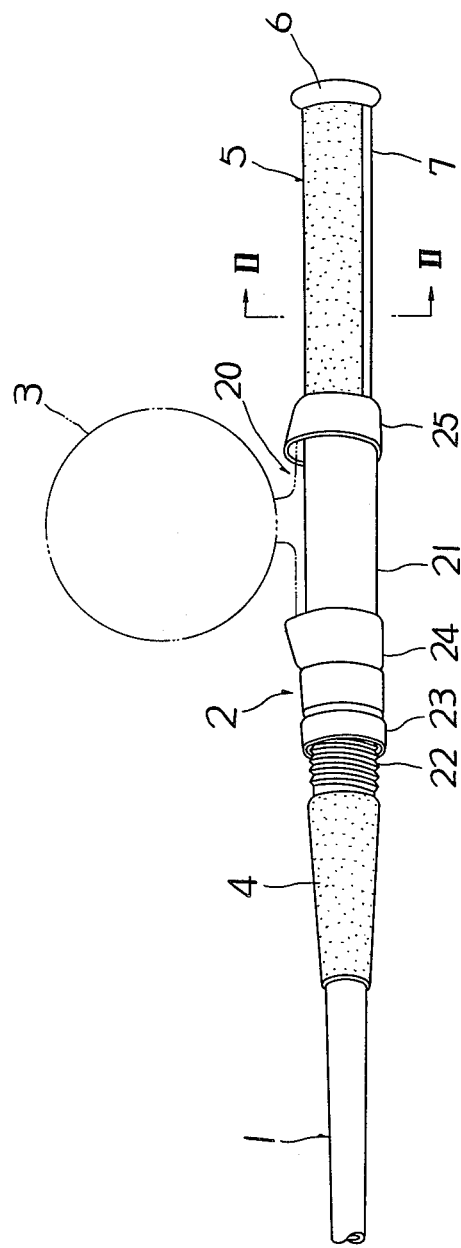
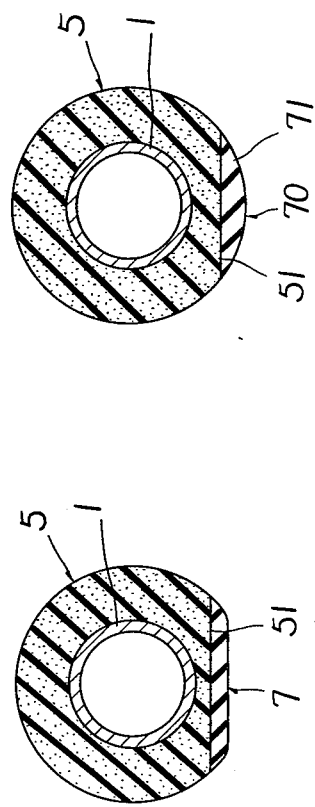
FIG. 1
FIG. 2
FIG. 3

FISHING ROD

FIELD OF THE INVENTION

The present invention relates to a fishing rod carrying a fishing reel and used mainly for boat fishing, and more particularly to a fishing rod which is provided at its bottom rod with a reel mounting portion for the fishing reel and behind the reel mounting portion with a flexible grip.

BACKGROUND OF THE INVENTION

Generally, this kind of fishing rod, as disclosed in, for example, the Japanese Utility Model Laid-Open Gazette No. Sho 61-150474, is provided at the bottom rod with a reel seat having a reel mounting portion and between the end of bottom rod and the reel seat with a flexible grip formed of, for example, ethylene acetate picopolymer.

When an angler during the boat-fishing is difficult to fish up a big hooked fish while gripping the grip at the fishing rod, he applies the bottom rod onto his waist and holds by his one hand the rod in front of the reel seat and operates the reel by the other hand. In case that the hooked fish runs, for example, laterally, he usually moves the rod body at the grip portion between the reel seat and the end of bottom rod along the edge of a boat while keeping it in contact therewith, thereby preventing the rod from being drawn into the sea.

In this case, since the aforsaid flexible grip is fitted onto the portion in contact with the edge of boat, the rod body does not smoothly slide thereon, whereby the angler cannot conform to movement of the hooked fish. Hence, the problem is created in that there is a fear of losing the hooked fish and of breaking the grip when slid along the edge of boat.

SUMMARY OF THE INVENTION

In the light of the above problem, the present invention has been designed. An object thereof is to provide a fishing rod which is smoothly slidable at the bottom rod along the edge of a boat and has no fear that a grip of the fishing rod is broken.

The fishing rod of the present invention provided at one circumferential side of the bottom rod of a rod body with a reel mounting portion for mounting a fishing reel onto the rod body, and behind the reel mounting portion with a grip, the fishing rod being characterized in that a sliding member of hard and wear-resistant material and of a predetermined length is mounted on at least one of the surface of the grip at a side of the reel mounting portion and that of the grip reverse thereto.

Accordingly, the sliding member of the invention is slidable along the edge of the boat to enable the rod body to be smoothly slided along the edge. Hence, the fishing rod can be handled inconformity with a hooked fish not to lose it and the grip is prevented from being broken or wearing out.

The above and further objects and novel features of the invention will more fully appear from the following detailed description when the same is read in connection with the accompanying drawing.

BRIEF DESCRIPTION OF THE DRAWINGS

FIG. 1 is a partially omitted front view of an embodiment of a fishing rod of the invention, FIG. 2 is an enlarged sectional view of the line II—II in FIG. 1, and FIG. 3 is an enlarged sectional view of a modified embodiment of the invention, showing the principal portion thereof.

DETAILED DESCRIPTION OF THE INVENTION

FIG. 1 shows a fishing rod on which a double bearing reel is mounted, in which reference numeral 1 designates a rod body of a jointed fishing rod at the bottom rod side. The rod body 1 is of prepreg impregnated with synthetic resin, wound onto a mandrel, burned under pressure, and formed hollow, which is not different in construction from the conventional one.

A reel seat 2 for mounting the double bearing reel 3 is mounted onto the bottom rod at the rod body 1.

The reel seat 2 is as well-known and comprises a cylindrical seat body 21 fitted onto the outer periphery of the rod body 1, a threaded ring 23 screwable with a screw thread 22 formed at one lengthwise end of the seat body 21, a movable holder 24 freely inserted onto the seat body 21 so as to be axially movable by operating the threaded ring 23, and a fixed holder 25 fixed to the other lengthwise end of the seat body 21, the double bearing reel 3 being mounted on a reel mounting portion 20 between both the holders 24 and 25.

A cylindrical front grip 4 is fitted onto the outer periphery of the rod body 1 in front of the reel seat 2 and a cylindrical rear grip 5 is fitted onto the outer periphery of the same behind the reel seat 2, both the grips 4 and 5 being formed of foaming synthetic resin, such as ethylene acetate picopolymer.

Into the end of the bottom rod at the rod body 1 is inserted a plug 6 for closing the opening of the rod body 1.

In the embodiment shown in FIGS. 1 and 2, a sliding member 7 of material superior in hardness and wear-resistance to the rear grip 5 is provided at the surface thereof at the reverse side to the reel mounting portion 20.

Concretely, the surface of rear grip 5 at the reverse side to the reel mounting portion 20 is cutaway in part and throughout the entire axial length so as to form a flat mounting surface 51 and the flat-plate-like sliding member 7 equal in length to the rear grip 5 is formed of hard rubber and bonded in curring to the mounting surface 51.

When a big fish is hooked in the boat-fishing, the angler puts the bottom rod to his waist and contacts the sliding member 7 on the edge of the boat while keeping the front grip 4 by his hand, so as to operate the reel 3. When the hooked fish runs transversely, he moves the fishing rod while sliding the rod body 1 along the edge of the boat through the sliding member 7.

In this case, the sliding member 7, which is formed of hard rubber superior in wear resistance, smoothly slides along the edge of the boat to have less fear of wearing or breaking the sliding member 7.

Alternatively, as shown in FIG. 3, a sliding member of the surface in a circular arc equal in the curvature to the outer periphery of the rear grip 5 may be mounted on the mounting surface 51.

Also, the sliding member 7 may be bonded to the grip 5 by use of an adhesive or fixed to the same by screws.

The sliding member 7 may alternatively be formed of hard synthetic resin superior in heat resistance and wear resistance, or of a metal plate of stainless steel.

The sliding member 7 of a desired length may partially be mounted on the bottom rod from its end toward the reel seat 2.

Also, for a fishing rod using, for example, a spinning reel, the sliding member 7 is preferred to be mounted on the surface of the rear grip 5 at a side of the reel mounting portion 20. Also, it is preferable for a fishing rod using both the spinning reel and the double bearing reel to provide the sliding members 7 at both the surface of the rear grip 5 at the reel mounting portion 20 side and the surface of the same reverse to the reel mounting portion 20.

As seen from the above, when the sliding member 7 is applied to the edge of the boat, the angler can smoothly slide thereon the rod body 1 through the sliding member 7. Hence, a good catch is expected to that extent and the grip 5 is prevented from being broken or wearing.

Although several embodiments have been described, they are merely exemplary of the invention and not to be constructed as limiting, the invention being defined solely by the appended claims.

What is claimed is:

1. A fishing rod, on which a fishing reel is mounted for use, comprising a rod body having a rod bottom, a reel mounting portion disposes at one circumferential side of said rod body near the end thereof, and a flexible grip mounted on said rod body behind said reel mounting portion, a sliding member having a predetermined length and formed of material wear-resistant and harder than said grip is provided on at least one surface of said grip at a side of said grip disposed opposite said reel mounting portion.

2. A fishing rod according to claim 1, wherein a flat mounting surface portion is provided on surface of said grip at a side of said grip opposite to said reel mounting portion, said sliding member being fixed to said mounting surface portion.

3. A fishing rod according to claim 1, wherein said grip is formed of foaming synthetic resin, said sliding member being formed of hard rubber.

* * * * *